US010815353B1

(12) United States Patent
Slutskii et al.

(10) Patent No.: US 10,815,353 B1
(45) Date of Patent: *Oct. 27, 2020

(54) COMPOSITION OF AND NOZZLE FOR SPRAYING A SINGLE-COMPONENT POLYURETHANE FOAM (71) Applicants: Konstantin Dragan, Moscow (RU); Vitalii Titorov, Moscow (RU)

(72) Inventors: Sergei Slutskii, Moscow Oblast (RU); Vitalii Titorov, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 16/388,391

(22) Filed: Apr. 18, 2019

Related U.S. Application Data (60) Continuation-in-part of application No. 15/429,586, filed on Feb. 10, 2017, which is a continuation-in-part of application No. 15/172,575, filed on Jun. 3, 2016, now abandoned, application No. 16/388,391, which is a continuation-in-part of application No. 15/955,403, filed on Apr. 17, 2018, which is a division of application No. 15/429,586, filed on Feb. 10, 2017, application No. 16/388,391, which is a continuation-in-part of application No. 15/955,448, filed on Apr. 17, 2018, now abandoned, which is a division of application No. 15/429,586, filed on Feb. 10, 2017, application No. 16/388,391, which is a continuation-in-part of application No. 15/955,479, filed on Apr. 17, 2018, which is a division of application No. 15/429,586, filed on Feb. 10, 2017.

(51) Int. Cl.
*C08G 18/32* (2006.01)
*C08G 18/76* (2006.01)
*C08J 9/00* (2006.01)
*C08J 9/14* (2006.01)

(52) U.S. Cl.
CPC .......... *C08J 9/141* (2013.01); *C08G 18/3206* (2013.01); *C08G 18/7671* (2013.01); *C08J 9/0038* (2013.01); *C08J 9/0042* (2013.01); *C08J 2203/14* (2013.01); *C08J 2375/04* (2013.01)

(58) Field of Classification Search
CPC ................ C08G 18/48; C08G 18/4804; C08G 18/4812; C08J 9/141; C08J 2203/14; C08J 2207/04
See application file for complete search history.

(56) References Cited

U.S. PATENT DOCUMENTS

| 1,559,655 | A | 11/1925 | Thompson |
| 2,722,458 | A | 11/1955 | Wahlin |
| 2,768,101 | A | 10/1956 | Fairchild |
| 2,785,005 | A | 3/1957 | Thompson |
| 2,981,712 | A | 4/1961 | Harper |
| 2,985,386 | A | 5/1961 | Steinen |
| 3,085,754 | A | 4/1963 | Thompson |
| 3,091,551 | A | 5/1963 | Robertson |
| 3,101,906 | A | 8/1963 | Webber |
| 3,236,455 | A | 2/1966 | Lewis et al. |
| 3,301,493 | A | 1/1967 | Frempter |
| 3,313,353 | A | 4/1967 | Williamson et al. |
| 3,401,888 | A | 9/1968 | Sutter |
| 3,556,411 | A | 1/1971 | Nord et al. |
| 3,647,147 | A | 3/1972 | Cook |
| 3,659,787 | A | 5/1972 | Ito |
| 3,737,108 | A | 6/1973 | Stumphauzer et al. |
| 3,754,710 | A | 8/1973 | Chimura |
| 3,843,055 | A | 10/1974 | Nord et al. |
| 3,857,809 | A | 12/1974 | Oertel et al. |
| 3,927,162 | A | 12/1975 | Stalter, Sr. |
| 4,071,195 | A | 1/1978 | Kuhns et al. |
| 4,097,000 | A | 6/1978 | Derr |
| 4,117,551 | A | 9/1978 | Brooks et al. |
| 4,213,936 | A | 7/1980 | Lodrick |
| 4,236,674 | A | 12/1980 | Dixon |
| 4,330,086 | A | 5/1982 | Nysted |
| 4,346,849 | A | 8/1982 | Rood |
| 4,618,101 | A | 10/1986 | Piggott |
| 4,641,785 | A | 2/1987 | Grothe |
| 4,646,977 | A | 3/1987 | Iwamura et al. |
| 4,759,500 | A | 7/1988 | Hoffman et al. |
| 4,811,903 | A | 3/1989 | Okuma et al. |

(Continued)

FOREIGN PATENT DOCUMENTS

| CA | 1137698 | 12/1982 |
| GB | 1273554 | 5/1972 |
| WO | 2015/041552 | 3/2015 |

OTHER PUBLICATIONS

TAP Plastics, Vinyl Tubing, Apr. 15, 2012, http://www.tapplastics.com/product/plastics/plastic_rods_tubes_shapes/vinyl_tubing/145.
United States Patent and Trademark Office, Office Action Summary dated Oct. 17, 2016, U.S. Appl. No. 15/172,575, 17 pages.
United States Patent and Trademark Office, Office Action Summary dated Jun. 6, 2017, U.S. Appl. No. 15/172,575, 17 pages.
United States Patent and Trademark Office, Office Action Summary dated Feb. 5, 2018, U.S. Appl. No. 15/429,586, 10 pages.
United States Patent and Trademark Office, Office Action Summary dated May 16, 2018, U.S. Appl. No. 15/429,586, 11 pages.
United States Patent and Trademark Office, Office Action Summary dated Feb. 7, 2019, U.S. Appl. No. 15/429,586, 9 pages.
United States Patent and Trademark Office, Office Action Summary dated Jul. 10, 2018, U.S. Appl. No. 15/955,403, 8 pages.
United States Patent and Trademark Office, Office Action Summary dated Dec. 27, 2018, U.S. Appl. No. 15/955,403, 9 pages.

(Continued)

Primary Examiner — Melissa A Rioja
(74) Attorney, Agent, or Firm — Cislo & Thomas, LLP (57) ABSTRACT

A composition for a single-component polyurethane foam and a method of using the same. The composition comprises a polyether or polyester or a combination thereof with functionality 2 and a hydroxyl number between about 22 mgKOH/g and about 374 mgKOH/g, a polyether or polyester or a combination thereof with functionality 3 and a hydroxyl number between about 84 mgKOH/g and about 842 mgKOH/g, a fire-retarding agent, a silicone stabilizer, a catalyst, polymeric diphenylmethane diisocyanate, a dimethyl ether, propane, isobutane or a combination thereof, and 1,1-difluoroethane or any other Freon, or any combination thereof.

24 Claims, 3 Drawing Sheets

(56) References Cited

U.S. PATENT DOCUMENTS

| | | |
|---|---|---|
| 4,882,107 A | 11/1989 | Cavender et al. |
| 5,141,156 A | 8/1992 | Hoy et al. |
| 5,143,302 A | 9/1992 | Sakuma |
| 5,167,371 A | 12/1992 | Rohner |
| 5,178,325 A | 1/1993 | Nielsen |
| 5,178,326 A | 1/1993 | Kukesh et al. |
| 5,185,383 A | 2/1993 | Regenauer |
| 5,275,340 A | 1/1994 | Haruch |
| 5,287,994 A | 2/1994 | Dempsey |
| 5,464,154 A | 11/1995 | Nielsen |
| 5,549,226 A | 8/1996 | Kopp |
| 5,597,122 A | 1/1997 | Eisenmann |
| 5,631,319 A * | 5/1997 | Reese ................ C08G 18/2815 521/137 |
| 6,136,942 A | 10/2000 | Pfenninger et al. |
| 6,371,392 B1 | 4/2002 | Steinman |
| 6,414,045 B1 | 7/2002 | Heimpel et al. |
| 6,552,097 B1 | 4/2003 | Pauls et al. |
| 6,872,337 B2 | 3/2005 | Mellentine et al. |
| 6,894,083 B2 | 5/2005 | Braun et al. |
| 7,111,799 B2 | 9/2006 | Batich et al. |
| 7,717,357 B2 | 5/2010 | Gantenbein et al. |
| 7,842,749 B2 | 11/2010 | Shalaby et al. |
| 7,958,609 B2 | 6/2011 | Gaydoul |
| 8,003,708 B2 | 8/2011 | Javarone |
| 8,118,052 B2 | 2/2012 | Swab et al. |
| 8,299,171 B2 | 10/2012 | Schmalkuche et al. |
| 8,324,340 B2 | 12/2012 | Burckhardt et al. |
| 8,557,886 B2 | 10/2013 | Golini et al. |
| 8,590,816 B2 | 11/2013 | Ballu |
| 10,350,617 B1 | 7/2019 | Slutskii et al. |
| 2003/0234301 A1 | 12/2003 | Swan |
| 2004/0124268 A1 | 7/2004 | Frazier et al. |
| 2004/0157945 A1 | 8/2004 | Barber |
| 2005/0150982 A1 | 7/2005 | Lopez et al. |
| 2005/0222289 A1 * | 10/2005 | Miller ................ B29C 44/468 521/155 |
| 2006/0182978 A1 | 8/2006 | Leroy et al. |
| 2007/0039547 A1 | 2/2007 | Lacchia |
| 2007/0069047 A1 | 3/2007 | Bolman et al. |
| 2007/0254973 A1 | 11/2007 | Emge et al. |
| 2008/0067720 A1 | 3/2008 | Wiese et al. |
| 2008/0087745 A1 | 4/2008 | Pearson et al. |
| 2008/0290197 A1 | 11/2008 | Fecht et al. |
| 2009/0107068 A1 | 4/2009 | Fay et al. |
| 2009/0230221 A1 | 9/2009 | Ballu |
| 2009/0272826 A1 | 11/2009 | Kioi |
| 2011/0059255 A1 | 3/2011 | Ogonowski |
| 2011/0121034 A1 | 5/2011 | Swab et al. |
| 2012/0128964 A1 | 5/2012 | Hulse et al. |
| 2013/0266736 A1 | 10/2013 | Wickert et al. |
| 2013/0324626 A1 | 12/2013 | Fabisiak et al. |
| 2014/0051776 A1 | 2/2014 | Chen et al. |
| 2014/0224828 A1 | 8/2014 | Demey et al. |
| 2015/0018508 A1 | 1/2015 | Verbeke et al. |
| 2015/0018509 A1 | 1/2015 | Verbeke et al. |
| 2015/0079406 A1 | 3/2015 | Tennebroek et al. |
| 2015/0144249 A1 | 5/2015 | Bowe et al. |
| 2015/0217336 A1 | 8/2015 | Seidel |
| 2015/0274967 A1 | 10/2015 | Taylor |
| 2015/0321206 A1 | 11/2015 | Swan |
| 2016/0271666 A1 | 9/2016 | Huber |
| 2016/0288075 A1 | 10/2016 | Lacroix et al. |
| 2016/0318050 A1 | 11/2016 | Zaarbelink |
| 2017/0225181 A1 | 8/2017 | Hammerlund |
| 2017/0241131 A1 | 8/2017 | Lewis |
| 2017/0333927 A1 | 11/2017 | Ross et al. |
| 2017/0341090 A1 | 11/2017 | Cameron et al. |
| 2017/0348713 A1 | 12/2017 | Titorov |
| 2018/0029566 A1 | 2/2018 | Gopalan et al. |
| 2018/0043376 A1 | 2/2018 | Titorov et al. |
| 2018/0043379 A1 | 2/2018 | Gantenbein et al. |
| 2018/0079881 A1 | 3/2018 | Zhang et al. |
| 2018/0104705 A1 | 4/2018 | Slutskii et al. |
| 2018/0104709 A1 | 4/2018 | Peters |
| 2018/0111140 A1 | 4/2018 | Miller |
| 2018/0117609 A1 | 5/2018 | Hodgkinson |

OTHER PUBLICATIONS

United States Patent and Trademark Office, Office Action Summary dated May 31, 2018, U.S. Appl. No. 15/955,448, 11 pages.

United States Patent and Trademark Office, Office Action Summary dated Jun. 25, 2018, U.S. Appl. No. 15/955,479, 16 pages.

* cited by examiner

```
S1 - MIX THE FOLLOWING COMPONENTS OF THE MIXED COLLECTIVE
COMPONENT IN A REACTOR

A 14.8 wt.% DIAL WITH A HYDROXL NUMBER BETWEEN ABOUT 35
AND ABOUT 180.
A 7.44 wt.% TRIAL WITH A HYDROXL NUMBER BETWEEN ABOUT 150
AND ABOUT 480.
A 8.88 wt.% FIRE-RETARDING AGENT TRI-CHLOROETHYL PHOSPHATE.
A 0.9 wt.% SILICONE STABILIZER, AND
A 0.42 wt.% DMDLS OR DMDEE CATALYST FOR FOAM OR FOAM
```

```
S2 - DISPENSE THE MIXED COLLECTIVE COMPONENT INTO A CONTAINER
```

```
S3 - ADD POLYMERIC MDI INTO THE CONTAINER
```

```
S4 - DISPENSE GASEOUS COMPONENTS SEPARATELY INTO THE CONTAINER
```

COMPOSITION OF AND NOZZLE FOR SPRAYING A SINGLE-COMPONENT POLYURETHANE FOAM

CROSS-REFERENCE TO RELATED APPLICATION

This patent application is a continuation-in-part of U.S. patent application Ser. No. 15/429,586 (filed Feb. 10, 2017), which is a continuation-in-part of U.S. patent application Ser. No. 15/172,575 (filed Jun. 3, 2016). This application is also a continuation-in-part of U.S. patent application Ser. No. 15/955,403 (filed Apr. 17, 2018), which is a divisional of U.S. patent application Ser. No. 15/429,586 (filed Feb. 10, 2017), a continuation-in-part of U.S. patent Ser. No. 15/955,448 (filed Apr. 17, 2018), which is a divisional of U.S. patent application Ser. No. 15/429,586 (filed Feb. 10, 2017), and a continuation-in-part of U.S. patent application Ser. No. 15/955,479 (filed Apr. 17, 2018), which is a divisional of U.S. patent application Ser. No. 15/429,586 (filed Feb. 10, 2017). This application also claims the benefit of U.S. Provisional Patent Application Ser. No. 62/294,974, entitled "One-Component Fire Resistant Polyurethane Foams and Nozzle for Application Thereof," filed Feb. 12, 2016, and the contents of all the applications listed above are incorporated herein by reference in their entirety.

TECHNICAL FIELD

This invention relates to a composition for a single component pre-polymer of polyurethane insulating foam and a spray nozzle that incorporates a metering opening to provide for a uniform fan-shaped distribution of the foamed product.

BACKGROUND

Polyurethane foam is increasingly being used as a sealant in both residential and commercial building construction for sealing spaces between door and window frames, in addition to more traditional uses such as insulation. When used as an insulator, polyurethane foam essentially fills any air space between the wall frames of a structure and thereby allows such insulated buildings to require substantially less energy to keep heated or cooled. Further, the foam can be sprayed to insulate spaces as a substitute for electric space heaters.

Polyurethane foam for on-site applications is typically supplied as a "single-component" foam or as a "two-component" foam. With both types of foam, the chemicals which create the foam are typically carried in portable containers, i.e. pressurized cylinders, and applied by an operator via an application gun. For two-component polyurethane foam systems, the two-part products harden by a chemical reaction of a resin and hardener, typically having a relatively short pot life, and may expose users to isocyanates or other toxic compounds. In a two-component foam composition, a reaction between methylene diphenyl diisocyanate (MDI) and glycols takes place directly during the spraying process, which releases to the atmosphere numerous hazardous emissions. During application of a two-component foam, the pressurized cylinders containing the foamable agents and the hardener are connected to a type of spray gun where the components are mixed in appropriate ratios via metering mechanisms contained in the gun and are subsequently sprayed.

There are two principal problems with two-component polyurethane foam systems. One problem is that the guns are typically made of stainless steel and/or brass and contain precise metering mechanisms that must be cleaned shortly after use. The guns must be cleaned shortly after use because in a two-component system, the foam hardens within a relatively short period of time via chemical reaction with the isocyanate hardener. If the foam is allowed to harden within a gun, the relatively costly gun becomes unusable and typically requires disassembly and the replacement of numerous parts in the metering mechanism to return the gun to a usable state.

The other principal problem with two-component polyurethane foam systems is that the isocyanate-based hardener is extremely toxic to the human nervous system. Isocyanates are readily absorbed via inhalation of vapor and skin contact. Therefore, the use of protective clothing and specialized respirators are required by workers applying a two-component polyurethane foam product.

To overcome some of the problems of two-component polyurethane foam systems, one-component foam products have been developed. In a one-component foam product, generally the resin or foamable component and the isocyanate component are supplied in a single pressurized container and dispensed through the container through a valve equipped gun, equipped with a nozzle attached to the pressurized container. With one-component polyurethane foam systems, when the foamable chemicals leave the nozzle reaction with moisture in the air causes the foam to harden. One component polyurethane foam products typically feature less overspray and introduce fewer airborne isocyanates to the atmosphere surrounding the worksite and are otherwise generally less toxic and safer to use than two-component foam systems.

With the development of single-component polyurethane foam systems, a need has arisen in the art for new foam application hardware that takes advantage of the fact that with a single-component system, there is no need to mix chemical components from two pressurized sources in precise ratios. Ideally, a new single-component foam application system would utilize low cost, easily transportable and easy to clean hardware which would allow the use of single-component polyurethane foams in a wider range of applications.

One-component polyurethane foams are used in the construction trades for filling and insulating walls, as well as for acting as a sealant and/or an adhesive. One-component polyurethane foams are particularly well suited for on-site application. They can essentially be used in any other industry where quality insulation is required. On-site applications for polyurethane foam have increased substantially in recent years extending the application of polyurethane foam beyond its traditional usage in the packaging and insulation fields. For example, polyurethane foam is increasingly being used as a sealant in both residential and commercial building construction for sealing spaces between door and window frames, in addition to more traditional uses as an insulation. In cold weather climates, polyurethane foam is now commonly used as an insulator to fill essentially any air space between the wall frames of a structure. Such insulated buildings require substantially less energy to heat than non-insulated buildings.

One-component polyurethane foams play an important role in improving energy efficiency, significantly improving window and door installation tasks. They can also be used for construction purposes (walls/partitions), and thermal insulation of attic floors, roofs, and basements, etc. In the automotive industry, they can be used as heat and noise insulation, as thermal insulation of refrigerators and insulated tank trucks, etc. In ship building, they can be used for heat-insulating of bulkheads, which prevents the formation of vapors.

Further, one-component polyurethane foams are ecologically-friendly because the main reaction of polymerization of polyisocyanate and polyol to form an isocyanate prepolymer takes place inside a pressured spray canister or spray can. The isocyanate prepolymer represents an intermediate stage in the polymerization process. Isocyanate group-containing prepolymers (isocyanate prepolymer), contained in one-component polyurethane foam compositions are known to those of skill in the art. Such prepolymers are commercially available and usually synthesized by the reaction of one or more polyols, such as a polyester or polyether.

However, most commercially available one-component foams come out in a tiny stream, which makes them suitable only for small-scale insulation (insulating cracks, holes, etc.) Therefore, there is a need in the art for a chemical composition for a one-component polyurethane foam having a viscosity and other characteristics that make the product particularly well-suited for being dispensed from a typical aerosol container, i.e. a spray can, and having a cone-shaped stream with a width of approximately 100 mm to approximately 400 mm.

There is also a need for a spray can nozzle capable of dispensing or spraying a one-component polyurethane foam of appropriate viscosity, at the pressures typically available from a spray can (about 3.5 to 12 atm), wherein the nozzle dispenses the foamable product at a mass flow rate of approximately 6 grams per second to approximately 10 grams per second. Experimentation has shown that such a mass flow rate is capable of covering a 1 $m^2$ surface with a foam layer having a thickness of approximately 30-50 mm after an application time of approximately 1 minute.

SUMMARY OF THE INVENTION

In a first embodiment, the present invention is directed to a composition of a single-component polyurethane foam, comprising a polyether or polyester or a combination thereof with functionality 2 and a hydroxyl number between about 22 mgKOH/g and about 374 mgKOH/g (and/or molar mass between about 300 g/mol and about 5000 g/mol), a polyether or polyester or a combination thereof with functionality 3 and a hydroxyl number between about 84 mgKOH/g and about 842 mgKOH/g (and/or molar mass between about 200 g/mol and about 2000 g/mol), a fire-retarding agent, a silicone stabilizer, a catalyst, polymeric diphenylmethane diisocyanate, a dimethyl ether, propane, isobutane or a combination thereof, and 1,1-difluoroethane or any other Freon, or any combination thereof In a second embodiment, the composition only comprises the polyether or polyester or a combination thereof with functionality 2 and a hydroxyl number between about 22 mgKOH/g and about 374 mgKOH/g (and/or molar mass between about 300 g/mol and about 5000 g/mol) a fire-retarding agent, a silicone stabilizer, a catalyst, polymeric diphenylmethane diisocyanate, a dimethyl ether, propane, isobutane or a combination thereof, and 1,1-difluoroethane or any other Freon, or any combination thereof, or In a third embodiment, the composition only comprises the polyether or polyester or a combination thereof with functionality 3 and a hydroxyl number between about 84 mgKOH/g and about 842 mgKOH/g (and/or molar mass between about 200 g/mol and about 2000 g/mol), a fire-retarding agent, a silicone stabilizer, a catalyst, polymeric diphenylmethane diisocyanate, a dimethyl ether, propane, isobutane or a combination thereof, and 1,1-difluoroethane or any other Freon, or any combination thereof.

In a fourth embodiment, the composition comprises a mixture of a polyether or polyester or a combination thereof with functionality 2 having a hydroxyl number between about 22 mgKOH/g and about 374 mgKOH/g (and/or molar mass between about 300 g/mol and about 5000 g/mol) and a polyether or polyester or a combination thereof with functionality 3 having a hydroxyl number between about 84 mgKOH/g and about 842 mgKOH/g (and/or molar mass between about 200 g/mol and about 2000 g/mol), wherein the average functionality of the mixture is between 2.1 and 2.9, a fire-retarding agent, a silicone stabilizer, a catalyst, polymeric diphenylmethane diisocyanate, a dimethyl ether, propane, isobutane or a combination thereof, and 1,1-difluoroethane or any other Freon, or any combination thereof In the first embodiment, the polyether or polyester or a combination thereof with functionality 2 can be from about 5.0 wt. % to about 18.0 wt. % and the polyether or polyester or combination thereof with functionality 3 can be from about 3.0 wt. % to about 10.00 wt. %.

In the second embodiment, the polyether or polyester or a combination thereof with functionality 2 can be from about 5.0 wt. % to about 28.0 wt. %.

In the third embodiment, the polyether or polyester or combination thereof with functionality 3 can be from about 3.0 wt. % to about 28.00 wt. %.

In the fourth embodiment, the mixture of the polyether or polyester with a functionality of 2 and a functionality of 3 can be from about 3.0 wt. % to about 28.0 wt. %.

The fire retarding agent can be tri-chloroethyl phosphate, tris-chloropropyl-phosphate, tris dichloropropyl phosphate or a combination thereof, and can be from about 5.0 wt. % to about 14.0 wt. %.

The silicone stabilizer can be polydimethyl siloxane polyoxyalkylene copolymer surfactant, and can be from about 2.5 wt. % to about 14.0 wt. % or from about 4.0 wt. % to about 14.0 wt. %.

The catalyst can be 2,2-dimorpholinodiethylether and can be from about 0.5 wt. % to about 3.0 wt. %.

The polymeric diphenylmethane diisocyanate can be from about 37.0 wt. % to about 49.0 wt. %.

The dimethyl ether can be from about 2.00 wt. % to about 9.10 wt. %.

The propane, isobutane or a combination thereof can be from about 10.0 wt. % to about 22.0 wt. %.

The 1,1-difluoroethane or any other Freon, or any combination thereof can be from about 0.00 wt. % to about 16.00 wt. %.

In a fifth embodiment, the present invention is directed to a method of using the composition. The method comprises the steps of:
  a. placing the composition within a pre-pressurized container or any other container; and
  b. dispensing the composition from the container in a wide cone shaped spray.

DETAILED DESCRIPTION OF THE INVENTION

The detailed description set forth below in connection with the appended drawing is intended as a description of presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Unless otherwise stated, the following terms as used herein have the following definitions.

"Hydroxyl number" of a polyol refers to the concentration of hydroxyl groups, per unit weight of the polyol, that are able to react with isocyanate groups. Hydroxyl number is reported as mg KOH/g, and is measured according to the standard ASTM D 1638.

The "average functionality", or "average hydroxyl functionality" of a polyol indicates the number of OH groups per molecule, on average. The average functionality of an isocyanate refers to the number of —NCO groups per molecule, on average.

The meaning of the term "isocyanate prepolymer" includes but is not limited to comprising a mixed polyisocyanate and a polyol in a liquid state.

The meaning of the term "polyisocyanate" includes but is not limited to di or higher isocyanates. The meaning of the term "polyol" includes, but is not limited to, mixtures of polyol and any polyol that can react in a known fashion with an isocyanate in preparing polyurethane foam. A polyol typically contains more than one hydroxyl group, wherein molecules that contain two hydroxyl groups are "diols" and those that contain three hydroxyl groups are "triols," etc.

The meaning of the term "container" refers to either a pressurized container such as a pressurized spray can or pressured spray canister, or like device, or any other container in which polyurethane foam can be put.

The term "single-component" is defined to contrast the prior art "two-component" polyurethane foam, which hardens by a chemical reaction of a resin and hardener, more specifically a reaction between methylene diphenyl diisocyanate (MDI) and glycols that takes place directly during the spraying process. The "single-component" aspect of the polyurethane foam, although it comprises multiple components/ingredients, refers to the main reaction of polymerization of polyisocyanate and polyol forming an isocyanate prepolymer inside a container, which then hardens through reacting with ambient moisture in the atmosphere.

A single-component polyurethane foam may comprise an isocyanate prepolymer filled into a pressurized spray canister or spray can together with at least one blowing agent or hydrocarbon propellant. A user then, for example, may bring the isocyanate prepolymer out of the pressurized spray canister, while the components of the isocyanate prepolymer cure by cross-linking during reaction with ambient moisture.

The invention accordingly relates to a single-component polyurethane foam comprising at least one polyether or polyester or a combination thereof, with an average functionality $f=2$, and therefore a linear polymer formed by polymerizing (i.e., a thermoplastic), a hydroxyl value between about 22 mgKOH/g to about 374 mg KOH/g and/or a molar mass of between about 300 g/mol and about 5000 g/mol, water within the polyester, if present, with volume less than 0.80 wt. %, a pH value of the polyester between about 4-8.5, an acid value below or equal to 0.2 mg KOH/g, and a propellant or blowing agent, preferably hydrocarbon-based and of an alkaline type having the formula $C_nH_{(2n+2)}$ (n being equal to or between 2 and 5).

Optionally, the single-component polyurethane foam further comprise at least one polyether or polyester or a combination thereof, with an average functionality $f=3$, with a hydroxyl number between about 84 mgKOH/g and about 842 mgKOH/g and/or a molar mass between about 200 g/mol and about 2000 g/mol, either in combination with or as a replacement for the polyether or polyester having a functionality $f=2$. Optionally, the hydroxyl value of the polyether or polyester with an average functionality $f=3$ can be between about 340 mg KOH/g to about 842 mg KOH/g.

If the polyether or polyester having a functionality $f=2$ used in combination with the polyether or polyester having a functionality $f=3$, the average functionality of the combination is between 2.1 and 2.9.

Optionally, the foam can further comprise:

a fire-retarding agent such as tris(2-chloroethyl) phosphate (TCEP), tris(chloropropyl) phosphate, or tris(dichloropropyl) phosphate, or any combination thereof;

a silicone stabilizer such as polydimethylsiloxane-polyoxyalkylene, which is a copolymer surfactant;

a catalyst such as 2,2-dimorpholinodiethylether;

polymeric diphenylmethane diisocyanate (MDI);

a dimethylether;

propane, isobutane, or any combination thereof; and 1,1-difluoroethane or any other Freon, or any combination thereof.

The functionality of a monomer molecule is the number of functional groups that participate in the polymerization. Monomers with functionality greater than two will introduce branching into a polymer, and the degree of polymerization will depend on the average functionality fav per monomer unit.

The polyether or polyester with a functionality $f=2$ can comprise from about 5.0 wt. % to about 18.0 wt. % of the foam or from about 5.0 wt. % to about 28.0 wt. % of the foam.

The polyether or polyester with a functionality $f=3$ can comprise from about 3.0 wt. % to about 10.0 wt. % of the foam or from about 3.0 wt. % to about 28.0 wt. % of the foam.

If the polyether or polyester having a functionality $f=2$ is used in combination with the polyether or polyester having a functionality $f=3$, the combination is from about 3.0 wt. % to about 28.0 wt. % of the foam.

The fire retarding agent can comprise from about 5.0 wt. % to about 14.0 wt. % of the foam.

The silicone stabilizer can comprise from about 4.0 wt. % to about 14.0 wt. % of the foam or from about 2.5 wt. % to about 14.0 wt. %.

The catalyst can comprise from about 0.5 wt. % to about 3.0 wt. % of the foam.

The polymeric diphenylmethane diisocyanate (MDI) can comprise from about 37.0 wt. % to about 49.0 wt. % of the foam.

The dimethylether can comprise from about 2.0 wt. % to about 9.10 wt. % of the foam.

The propane, isobutene, or combination thereof, can comprise from about 10.0 wt. % to about 22.0 wt. % of the foam.

The 1,1-difluoroethane or any other Freon, or any combination thereof can comprise from about 0.0 wt. % to about 16.0 wt. % of the foam.

EXAMPLES

In preferred first embodiment, the one-component polyurethane pre-polymer composition comprises:

| Components | Parts by Weight |
| --- | --- |
| a polyether or polyester, or combination thereof, with a functionality of two | 5.0-18.0 wt. % |
| a polyether or polyester, or combination thereof, with a functionality of three | 3.0-10.0 wt. % |
| a fire-retarding agent | 5.0-1.4.0 wt. % |
| a silicone stabilizer | 2.5-14.0 wt. % |
| a catalyst for foams or their mix | 0.5-3.0 wt. % |
| polymeric diphenylmethane diisocyanate | 37.0-49.0 wt. % |
| a dimethyl ether | 2.0-9.10 wt. % |
| a propane or a isobutane, or combination thereof | 10.0-22.0 wt. % |
| 1,1-difluoroethane or any other Freon, or any combination thereof | 0.0-16.0 wt. % |

In a second embodiment, the one-component polyurethane pre-polymer composition comprises:

| Components | Parts by Weight |
| --- | --- |
| a mixture of: a polyether or polyester, or combination thereof, with a functionality of two and a polyether or polyester, or combination thereof, with a functionality of three | 3.0-28.0 wt. .% |
| a fire-retarding agent | 5.0-14.0 wt. % |
| a silicone stabilizer | 2.5-14.0 wt. % |
| a catalyst for foams or their mix | 0.5-3.0 wt. % |
| polymeric diphenylmethane diisocyanate | 37.0-49.0 wt. % |
| a dimethyl ether | 2.0-9.10 wt. % |
| a propane or a isobutane, or combination thereof | 10.0-22.0 wt. % |
| 1,1-difluoroethane or any other Freon, or any combination thereof | 0.0-16.0 wt. % |

In a third embodiment, the one-component polyurethane pre-polymer composition comprises:

| Components | Parts by Weight |
| --- | --- |
| a polyether or polyester, or combination thereof, with a functionality of two | 5.0-28.0 wt. % |
| a fire-retarding agent | 5.0-14.0 wt. % |
| a silicone stabilizer | 2.5-14.0 wt. % |
| a catalyst for foams or their mix | 0.5-3.0 wt. % |
| polymeric diphenylmethane diisocyanate | 37.0-49.0 wt. % |
| a dimethyl ether | 2.0-9.10 wt. % |
| a propane or a isobutane, or combination thereof | 10.0-22.0 wt. % |
| 1,1-difluoroethane or any other Freon, or any combination thereof | 0.0-16.0 wt. % |

In a fourth embodiment, the one-component polyurethane pre-polymer composition comprises:

| Components | Parts by Weight |
| --- | --- |
| a polyether or polyester, or combination thereof, with a functionality of three | 3.0-28.0 wt. % |
| a fire-retarding agent | 5.0-14.0 wt. % |
| a silicone stabilizer | 2.5-14.0 wt. % |
| a catalyst for foams or their mix | 0.5-3.0 wt. % |
| polymeric diphenylmethane diisocyanate | 37.0-49.0 wt. % |
| a dimethyl ether | 2.0-9.10 wt. % |
| a propane or a isobutene, or combination thereof | 10.0-22.0 wt. % |
| 1,1-difluoroethane or any other Freon, or any combination thereof | 0.0-16.0 wt. % |

Herein, the weight percentages combining to total 100%, with water volume within the polymer, if present, to be less than 0.1%.

Figure 1:
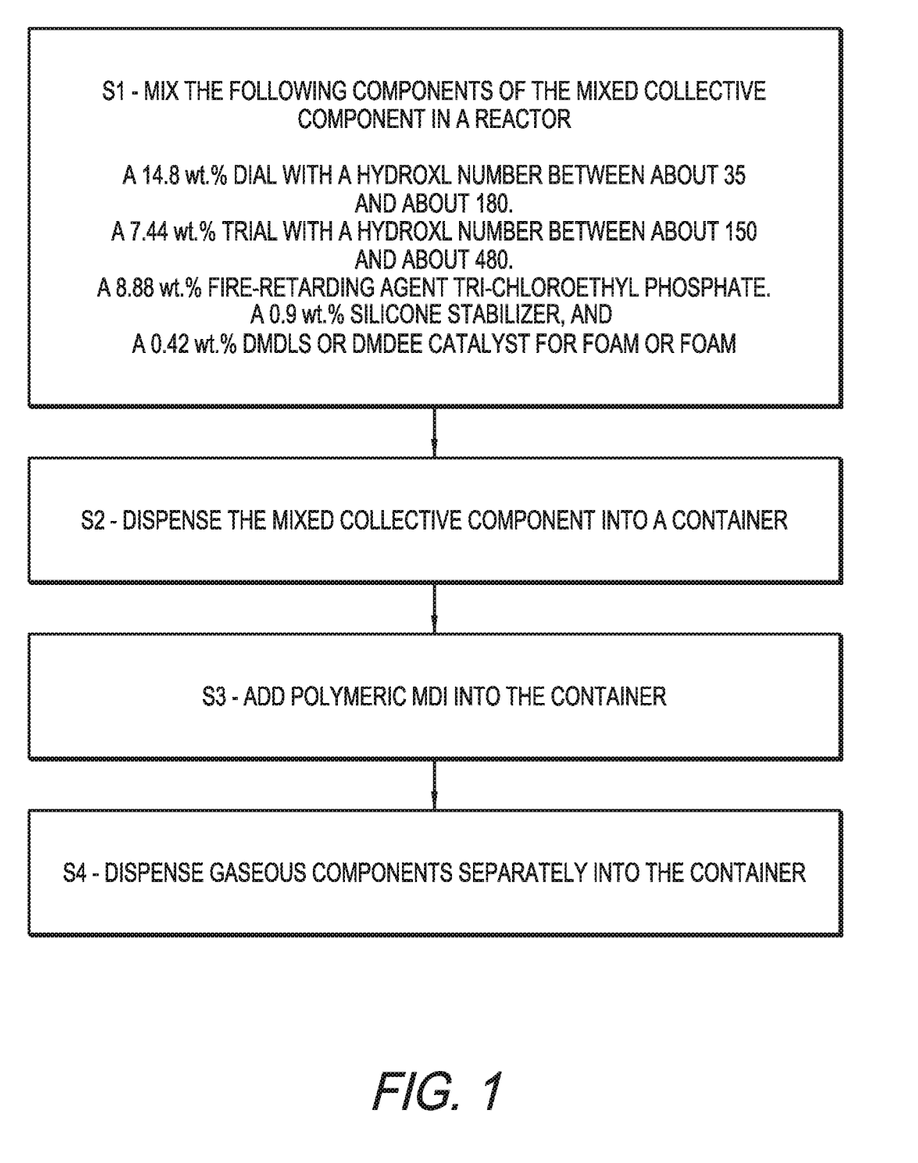
FIG. 1 shows a flow diagram of an exemplary method of production of the composition of the present invention.
Figure 2:
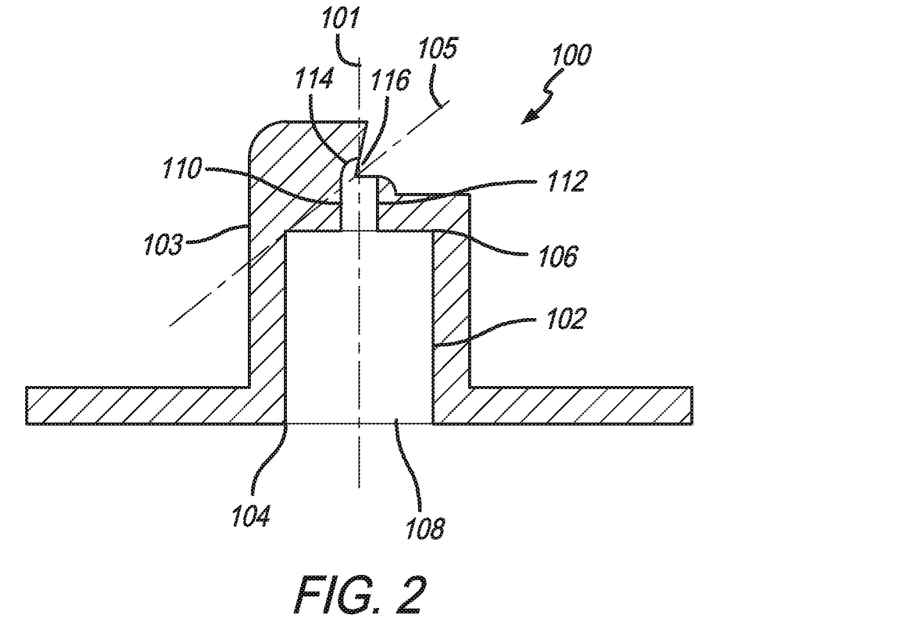
FIG. 2 shows a cross-sectional side view of the nozzle for spraying the composition of the present invention.
Figure 3:
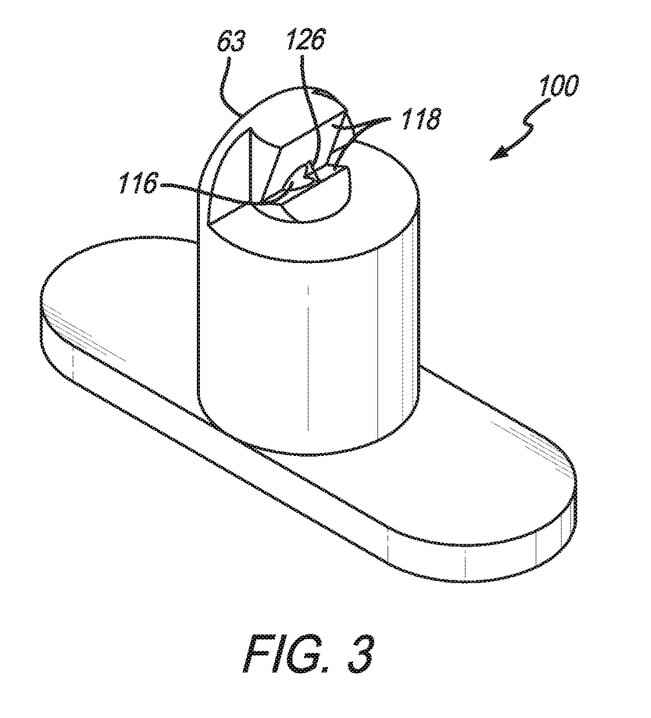
FIG. 3 shows a perspective view of the nozzle for spraying the composition of the present invention.

The single-component polyurethane foam may be prepared by mixing the following components into a mixed collective component in a reactor (S1):

a, from about 5.0 wt. % to about 18.0 wt. % polyether or polyester or a combination thereof with functionality 2 and a hydroxyl number between about 22 mgKOH/g and about 374 mgKOH/g (and/or a molar mass between about 300 g/mol and about 5000 g/mol), a, from about 3.0 wt. % to about 10.00 wt. %, polyether or polyester or a combination thereof with functionality 3 and a hydroxyl number between about 84 mgKOH/g and about 842 mgKOH/g (and/or a molar mass between about 200 g/mol and about 2000 g/mol), a, from about 5.0 wt. % to about 14.0 wt. % fire-retarding agent, a, from about 2.5 wt. % to about 14.0 wt. % silicone stabilizer, and a, from about 0.5 wt. % to about 3.0 wt. % catalyst.

Optionally, instead of using both the polyether or polyester or a combination thereof with functionality 2 and the polyether or polyester or a combination thereof with functionality 3, either the polyether or polyester or a combination thereof with functionality 2 can used alone, or the polyether or polyester or a combination thereof with functionality 3 can be used alone. If the polyether or polyester or a combination thereof with functionality 2 is used alone, then it comprises from about 5.0 wt. % to about 28.0 wt. %. If the polyether or polyester or a combination thereof with functionality 3 is used alone, then it comprises from about 3.0 wt. % to about 28.0 wt. %.

Additionally, it is possible to combine the polyether/polyester with functionality 2 with the polyether/polyester with functionality 3, producing a mixture of the two having an average functionality between 2.1 and 2.9. In this instance, the mixture would have a wt. % from about 3.0 wt. % to about 28.0 wt. %.

Afterwards, one of the four different mixed collective components outlined above is introduced into the container (S2) and polymeric MDI and all other gaseous components are introduced separately into the container (S3).

Experimental results show that the composition of the present invention is an improvement over the prior art because it allows to form a cone-shaped stream, while retaining all of the product's qualities (adhesiveness, structural uniformity, eco-friendliness, etc.) Hence, the present invention is the first one-component polyurethane foam, which has functionality of two-component polyurethane foams in that it is able form a wide cone-shaped stream.

Further, the chemical composition, comprising polyurethane pre-polymer dissolved in liquid hydrocarbons, or other volatile polar solvents, would be in a suspended condition wherein the polymer would be exposed with the gases, namely the hydrocarbon propellant matching the formula $C_nH_{(2n+2)}$ (n being equal to or between 2 and 5), or any combination of such hydrocarbons. The volume of the gases must be considerably larger than pre-polymer in the system, and must compound to more than 20 wt. %. Further, in the preferred embodiment, the hydrocarbon is a halogenoalkane gas, which not only participates in foaming and formation of a spongy polymer, but also plays a role in spreading the polymer homogeneously over a surface from the distance.

Further, the composition is suitable for use for general insulation purposes, particularly well-suited to be sprayed from a pressurized container, such as a spray can, or any other container. With a suitable nozzle, the foam composition of the present invention can be sprayed over a surface with a capacity of 1 m²/minute, at a flow rate of the spray of approximately 6 grams per second to approximately 10 grams per second, and gaining a thickness of the coated layer up to 30-50 mm, at typical spray can operating pressures of about 3.5 to 12 atm.

The round slot-shaped orifice allows the polymer to be sprayed over a surface in one very smooth layer; and so that after the final foaming, which takes place not earlier than 15 minutes after spraying, the layer will be smooth and uniform. Other geometrical configurations of the orifice can cause irregularities to the sprayed layer on a surface, which may lead to excessive consumption of product from the spraying system. Further, the viscosity of the product may be varied as necessary to allow the product to be sprayed from spray equipment operating with greater or smaller orifice openings and/or at higher or lower internal pressures.

With reference to FIGS. 2-5, a nozzle 100 of the present invention includes a pressure chamber 102 having a proximate end 104 and distal end 106 with a generally circular bore 108 therebetween. Immediately adjacent the pressure chamber 102 is a nozzle head 103. In fluid communication with the distal end 106 of the generally circular bore 108 of the pressure chamber 102 is a discharge tube 110, having a diameter 121 and a proximate end 112, which is exposed to the generally circular bore 108 of the pressure chamber 102. The discharge tube 110, having a central axis 101, terminates at a distal end 114, which terminates at a round slot-shaped discharge orifice 116.

In the exemplary embodiment, formed into the nozzle head 103 are inwardly angled v-shaped walls 118 (see FIG. 3), forming a 60 degree angle that has a bisecting angle 105. The inwardly angled v-shaped walls 118 intersect with and cut through a portion of the round slot-shaped discharge orifice 116, such that the bisecting angle 105 is 45 degrees from the central axis 101 of the discharge tube 110. Accordingly, the length 122 of the round slot-shaped orifice 116 corresponds to the diameter 121 of the discharge tube 110.

Figure 4:
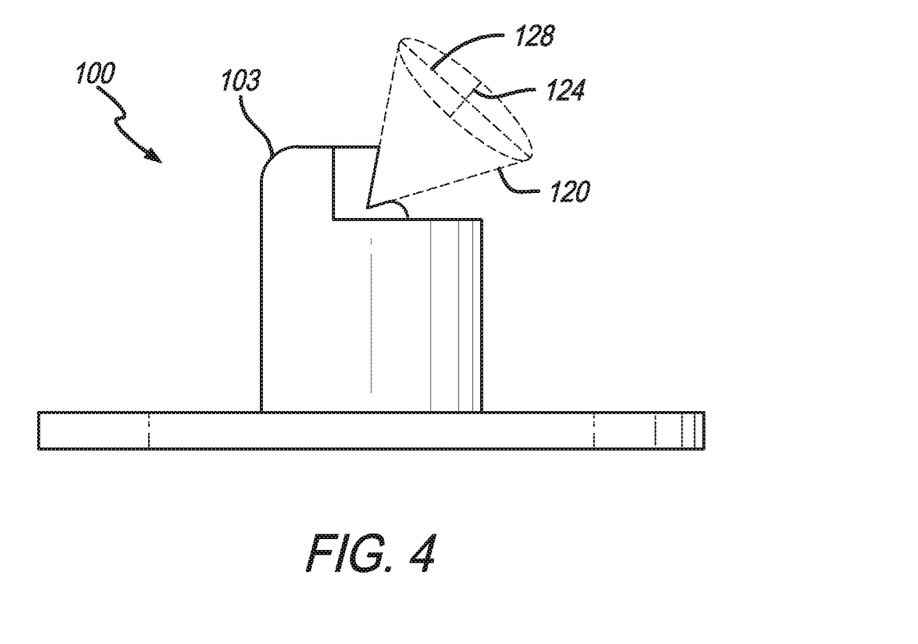
FIG. 4 shows a side view of the nozzle for spraying the composition and the spray pattern of the present invention.
Figure 5:
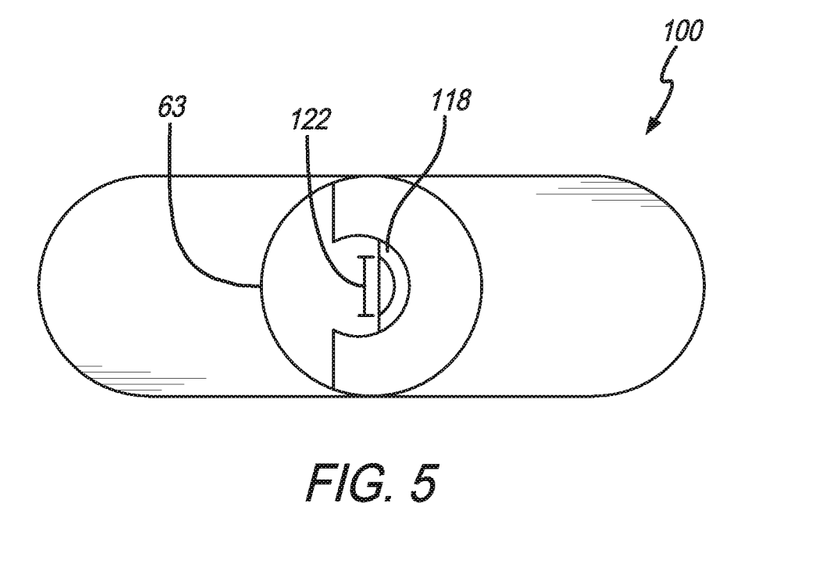
FIG. 5 shows a top view of the nozzle for spraying the composition of the present invention.

As shown in FIG. 4, the shape of the round slot-shaped discharge orifice 116 allows foamable product to be dispensed from the pressurized source of sprayable foam material in a cone-shaped pattern 120. The length 122 of the round slot-shaped discharge orifice 116 tends to control the effective length 124 of the cone-shaped spray pattern 120. The width 126 of the round slot-shaped discharge orifice 116 tends to control the width 128 of the spray pattern 120. The width of the cone-shaped spray pattern depends on the temperature of the balloon, which must be between 10-50° C., as well as on the distance from the nozzle to the surface being sprayed, and can vary from 100 mm to 400 mm. The distance from the nozzle tip to the sprayed surface should be within 100 mm to 800 mm.

Experimentation has shown that the nozzle 100 having a round slot-shaped orifice 116 helps the foam achieve a uniform structure. Experimentation has further shown that the length 122 of the round slot-shaped orifice 116 should ideally be approximately 1.1 mm to approximately 3.5 mm, or ideally at 2 mm.

Experimental results have shown that the polyurethane foam composition of the present invention when loaded in a spray can with an operating pressure of 3.5 to 12 atm and equipped with the nozzle 100 of the present invention provides structural uniformity in the sprayed foam, as well as high adhesiveness, such that the sprayed foam could not be easily removed from a surface. Further, experimental results also show that, when the nozzle 100 of the present invention is used with other one-component polyurethane compositions, the following results are obtained:

When other one-component polyurethane compositions' foams are cut in half, they have ununiformed structures—there were big and small holes.

Half of the other one-component polyurethane compositions' foams were spraying tiny streams (unlike the foam of the present invention that comes out in a wide cone), and the other half of the one-component polyurethane compositions' foams hardly came out at all. The wide, cone-shaped spray of the present invention is advantageous because it provides better surface area coverage than other spray-foams that dispense in tiny streams. This is something that was difficult to achieve with a one-component foam. Greater coverage when being sprayed means quicker application to large surface areas, allowing the present invention to effectively perform its insulation function.

Additionally, all other one-component polyurethane compositions' foams had low adhesiveness, such that we could easily remove the sprayed foams from a surface (unlike the foam of the present invention that could not be removed from the surface without equipment).

The maximum thickness of the coating layer of all other one-component polyurethane compositions' foams was approximately 1 cm (while thickness of the coating layer of the foam of the present invention reached up to approximately 5 cm).

What is claimed is:

1. A composition of a single-component polyurethane foam, comprising:
   a) a polyether or polyester or a combination thereof each with a functionality of 2;
   b) a polyether or polyester or a combination thereof each with a functionality of 3
   c) a fire-retarding agent;
   d) a silicone stabilizer;
   e) a catalyst;
   f) polymeric diphenylmethane diisocyanate;
   g) dimethyl ether;
   h) propane, isobutane or a combination thereof; and
   i) 1,1-difluoroethane, trans-1,3,3,3-tetrafluoroprop-1-ene, any other other refrigerant, or any combination thereof;
   wherein, when the composition is sprayed from an aerosol container comprising a nozzle onto a spray surface, the composition has a cone-shaped spray pattern with a width of at least 100 mm, measured from a distance of at least 100 mm from the tip of the nozzle to the spray surface.

2. The composition of claim 1, wherein:
   a) the polyether or polyester or a combination thereof each with a functionality of 2 is from about 5.0 wt. % of the composition to about 18.0 wt. % of the composition;
   b) the polyether or polyester or combination thereof each with a functionality of 3 is from about 3.0 wt. % of the composition to about 10.00 wt. % of the composition;

c) the fire-retarding agent is from about 5.0 wt. % of the composition to about 14.0 wt. % of the composition;
d) the silicone stabilizer is from about 2.5 wt. % of the composition to about 14.0 wt. % of the composition;
e) the catalyst is from about 0.5 wt. % of the composition to about 3.0 wt. % of the composition;
f) the polymeric diphenylmethane diisocyanate is from about 37.0 wt. % of the composition to about 49.0 wt. % of the composition;
g) the dimethyl ether is from about 2.00 wt. % of the composition to about 9.10 wt. % of the composition;
h) the propane, isobutane or a combination thereof is from about 10.0 wt. % of the composition to about 22.0 wt. % of the composition; and
i) 1,1-difluoroethane or trans-1,3,3,3-tetrafluoroprop-1-ene, any other refrigerant, or any combination thereof is from greater than 0.00 wt. % of the composition to about 16.00 wt. % of the composition.

3. The composition of claim 1, wherein the fire retarding agent is tri-chloroethyl phosphate, tris-chloropropyl-phosphate, tris-dichloropropyl-phosphate or a combination thereof.

4. The composition of claim 1, wherein the silicone stabilizer is a polydimethyl siloxane polyoxyalkylene copolymer surfactant.

5. The composition of claim 1, wherein the catalyst is 2,2-dimorpholinodiethylether.

6. A composition of a single-component polyurethane foam, comprising:
a) a polyether or polyester or a combination thereof each with a functionality of 2;
b) a fire-retarding agent;
c) a silicone stabilizer;
d) a catalyst;
e) polymeric diphenylmethane diisocyanate;
f) dimethyl ether;
g) propane, isobutane or a combination thereof; and
h) 1,1,1-difluoroethane, trans-1,3,3,3-tetrafluoroprop-1-ene, any other refrigerant, or any combination thereof;
wherein, when the composition is sprayed from an aerosol container comprising a nozzle onto a spray surface, the composition has a cone-shaped spray pattern with a width of at least 100 mm, measured from a distance of at least 100 mm from the tip of the nozzle to the spray surface.

7. The composition of claim 6, wherein:
a) the polyether or polyester or or a combination thereof each with a functionality of 2 is from about 5.0 wt. % of the composition to about 28.0 wt. % of the composition;
b) the fire-retarding agent is from about 5.0 wt. % of the composition to about 14.0 wt. % of the composition;
c) the silicone stabilizer is from about 2.5 wt. % of the composition to about 14.0 wt. % of the composition;
d) the catalyst is from about 0.5 wt. % of the composition to about 3.0 wt. % of the composition;
e) the polymeric diphenylmethane diisocyanate is from about 37.0 wt. % of the composition to about 49.0 wt. % of the composition;
f) the dimethyl ether is from about 2.00 wt. % of the composition to about 9.10 wt. % of the composition;
g) the propane, isobutane or a combination thereof is from about 10.0 wt. % of the composition to about 22.0 wt. % of the composition; and
h) 1,1-difluoroethane, trans-1,3,3,3-tetrafluoroprop-1-ene, any other refrigerant, or any combination thereof is from greater than 0.00 wt. % of the composition to about 16.00 wt. % of the composition.

8. The composition of claim 6, wherein the fire retarding agent is tri-chloroethyl phosphate, tris-chloropropyl-phosphate, tris-dichloropropyl-phosphate or a combination thereof.

9. The composition of claim 6, wherein the silicone stabilizer is a polydimethyl siloxane polyoxyalkylene copolymer surfactant.

10. The composition of claim 6, wherein the catalyst is 2,2-dimorpholinodiethylether.

11. A composition of a single-component polyurethane foam, comprising:
a) a polyether or polyester or a combination thereof each with a functionality of 3;
b) a fire-retarding agent;
c) a silicone stabilizer;
d) a catalyst;
e) polymeric diphenylmethane diisocyanate;
f) dimethyl ether;
g) propane, isobutane or a combination thereof; and
h) 1,1-difluoroethane, trans-1,3,3,3-tetrafluoroprop-1-ene, any other refrigerant, or any combination thereof;
wherein, when the composition is sprayed from an aerosol container comprising a nozzle onto a spray surface, the composition has a cone-shaped spray pattern with a width of at least 100 mm, measured from a distance of at least 100 mm from the tip of the nozzle to the spray surface.

12. The composition of claim 11, wherein:
a) the polyether or polyester or a combination thereof each with a functionality of 3 is from about 3.0 wt. % of the composition to about 28.00 wt. % of the composition;
b) the fire-retarding agent is from about 5.0 wt. % of the composition to about 14.0 wt. % of the composition;
c) the silicone stabilizer is from about 2.5 wt. % of the composition to about 14.0 wt. % of the composition;
d) the catalyst is from about 0.5 wt % of the composition to about 3.0 wt. % of the composition;
e) the polymeric diphenylmethane diisocyanate is from about 37.0 wt. % of the composition to about 49.0 wt. % of the composition;
f) the dimethyl ether is from about 2.00 wt. % of the composition to about 9.10 wt. % of the composition;
g) the propane, isobutane or a combination thereof is from about 10.0 wt. % of the composition to about 22.0 wt. % of the composition; and
h) 1,1-difluoroethane, trans-1,3,3,3-tetrafluoroprop-1-ene, any other refrigerant, or any combination thereof is from greater than 0.00 wt. % of the composition to about 16.00 wt. % of the composition.

13. The composition of claim 11, wherein the fire retarding agent is tri-chloroethyl phosphate, tris-chloropropyl-phosphate, tris-dichloropropyl-phosphate or a combination thereof.

14. The composition of claim 11, wherein the silicone stabilizer is a polydimethyl siloxane polyoxyalkylene copolymer surfactant.

15. The composition of claim 11, wherein the catalyst is 2,2-dimorpholinodiethylether.

16. A composition of a single-component polyurethane foam, comprising:
a) a mixture of a polyether or polyester or a combination thereof each with a functionality of 2 and a polyether or polyester or a combination thereof each with a functionality of 3, wherein the average functionality of the mixture is between 2.1 and 2.9;
b) a fire-retarding agent;
c) a silicone stabilizer;

d) a catalyst;
e) polymeric diphenylmethane diisocyanate;
f) dimethyl ether;
g) propane, isobutane or a combination thereof; and
h) 1,1-difluoroethane, trans-1,3,3,3-tetrafluoroprop-1-ene, any other refrigerant, or any combination thereof;

wherein, when the composition is sprayed from an aerosol container comprising a nozzle onto a spray surface, the composition has a cone-shaped spray pattern with a width of at least 100 mm, measured from a distance of at least 100 mm from the tip of the nozzle to the spray surface.

17. The composition of claim 16, wherein:
 a) the mixture is from about 3.0 wt. % of the composition to about 28.0 wt. % of the composition;
 b) the fire-retarding agent is from about 5.0 wt. % of the composition to about 14.0 wt. % of the composition;
 c) the silicone stabilizer is from about 2.5 wt. % of the composition to about 14.0 wt. % of the composition;
 d) the catalyst is from about 0.5 wt. % of the composition to about 3.0 wt. % of the composition;
 e) the polymeric diphenylmethane diisocyanate is from about 37.0 wt. % of the composition to about 49.0 wt. % of the composition;
 f) the dimethyl ether is from about 2.00 wt. % of the composition to about 9.10 wt. % of the composition;
 g) the propane, isobutane or combination thereof is from about 10.0 wt. % of the composition to about 22.0 wt. % of the composition; and
 h) 1,1-difluoroethane, trans 1,3,3,3-tetrafluoroprop-1-ene, any other refrigerant, or any combination thereof is from greater than 0.00 wt. % of the composition to about 16.00 wt. % of the composition.

18. The composition of claim 16, wherein the fire retarding agent is tri-chloroethyl phosphate, tris-chloropropyl-phosphate, tris-dichloropropyl-phosphate or a combination thereof.

19. The composition of claim 16, wherein the silicone stabilizer is a polydimethyl siloxane polyoxyalkylene copolymer surfactant.

20. The composition of claim 16, wherein the catalyst is 2,2-dimorpholinodiethylether.

21. A method of using the composition of claim 1, the method comprising the steps of:
 a) placing the composition of claim 1 within a pre-pressurized container or any other container; and
 b) dispensing the composition from the container in a wide cone shaped spray.

22. A method of using the composition of claim 6, the method comprising the steps of:
 a) placing the composition of claim 6 within a pre-pressurized container or any other container; and
 b) dispensing the composition from the container in a wide cone shaped spray.

23. A method of using the composition of claim 11, the method comprising the steps of:
 a) placing the composition of claim 11 within a pre-pressurized container or any other container; and
 b) dispensing the composition from the container in a wide cone shaped spray.

24. A method of using the composition of claim 16, the method comprising the steps of:
 a) placing the composition of claim 16 within a pre-pressurized container or any other container; and
 b) dispensing the composition from the container in a wide cone shaped spray.

* * * * *